United States Patent
DeBates et al.

(10) Patent No.: US 10,839,059 B2
(45) Date of Patent: *Nov. 17, 2020

(54) ELECTRONIC DEVICE WITH GESTURE ACTUATION OF COMPANION DEVICES, AND CORRESPONDING SYSTEMS AND METHODS

(71) Applicant: Motorola Mobility LLC, Chicago, IL (US)

(72) Inventors: Scott DeBates, Crystal Lake, IL (US); Douglas Lautner, Round Lake, IL (US); Vivek Tyagi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,077

(22) Filed: Jun. 6, 2019

(65) Prior Publication Data

US 2019/0286801 A1    Sep. 19, 2019

Related U.S. Application Data

(63) Continuation of application No. 15/209,514, filed on Jul. 13, 2016, now Pat. No. 10,372,892.

(51) Int. Cl.
*G06F 21/32*    (2013.01)
*G06F 1/3293*    (2019.01)
(Continued)

(52) U.S. Cl.
CPC ............ *G06F 21/32* (2013.01); *G06F 1/3293* (2013.01); *G06F 3/017* (2013.01); *G06F 3/0346* (2013.01);
(Continued)

(58) Field of Classification Search
CPC ...................................................... F06F 21/32
See application file for complete search history.

(56) References Cited

U.S. PATENT DOCUMENTS

| 10,063,677 B2 | 8/2018 | Cavallaro et al. |
| 2002/0138767 A1 | 9/2002 | Hamid |

(Continued)

FOREIGN PATENT DOCUMENTS

| CN | 104850769 | 8/2015 |
| EP | 2500898 | 9/2012 |

(Continued)

OTHER PUBLICATIONS

Gee, Jason , "Final Office Action", U.S. Appl. No. 15/209,534, filed Jul. 13, 2016; dated Dec. 13, 2018.

(Continued)

*Primary Examiner* — Simon P Kanaan
(74) *Attorney, Agent, or Firm* — Philips H. Burrus, IV

(57) ABSTRACT

An electronic device includes a biometric sensor, such as a fingerprint sensor, that identifies biometric input received at the biometric sensor. One or more processors operable with the biometric sensor identify one or more companion devices operating within a wireless communication radius of the electronic device. Where multiple companion devices are within the wireless communication radius, a user can make a selection of one or more of them. One or more gesture sensors identify a predefined gesture input, such as a key turn simulation. A wireless communication circuit responsive to the one or more processors, delivers an actuation credential to at least one companion device to control the companion device.

20 Claims, 14 Drawing Sheets

(51) Int. Cl.

| | | |
|---|---|---|
| *G06F 3/01* | (2006.01) | |
| *G08C 17/02* | (2006.01) | |
| *H04M 1/725* | (2006.01) | |
| *G06F 3/0488* | (2013.01) | |
| *G06F 3/0346* | (2013.01) | |
| *H04W 12/00* | (2009.01) | |
| *G06F 21/36* | (2013.01) | |
| *H04L 29/06* | (2006.01) | |

(52) U.S. Cl.
CPC .......... *G06F 3/04883* (2013.01); *G06F 21/36* (2013.01); *G08C 17/02* (2013.01); *H04M 1/7253* (2013.01); *H04M 1/72533* (2013.01); *H04W 12/003* (2019.01); *G06F 2203/0383* (2013.01); *G06F 2203/0384* (2013.01); *G08C 2201/32* (2013.01); *G08C 2201/61* (2013.01); *G08C 2201/91* (2013.01); *G08C 2201/92* (2013.01); *G08C 2201/93* (2013.01); *H04L 63/0861* (2013.01); *H04W 12/00503* (2019.01); *H04W 12/00508* (2019.01); *Y02D 10/122* (2018.01)

(56) References Cited

U.S. PATENT DOCUMENTS

| | | |
|---|---|---|
| 2003/0172283 A1 | 9/2003 | O'Hara |
| 2007/0057935 A1 | 3/2007 | Takagi |
| 2007/0171921 A1 | 7/2007 | Wookey |
| 2008/0238610 A1 | 10/2008 | Rosenberg |
| 2009/0240940 A1 | 9/2009 | Shoemake et al. |
| 2011/0095974 A1 | 4/2011 | Moriwaki |
| 2011/0312311 A1 | 12/2011 | Abifaker et al. |
| 2013/0076663 A1 | 3/2013 | Sirpal et al. |
| 2014/0028435 A1 | 1/2014 | Brockway, III |
| 2014/0098095 A1 | 4/2014 | Lee |
| 2014/0118317 A1 | 5/2014 | Song et al. |
| 2014/0160337 A1 | 6/2014 | Van Den Herik |
| 2014/0306985 A1 | 10/2014 | Jeong |
| 2014/0320274 A1 | 10/2014 | De Schepper et al. |
| 2015/0022515 A1 | 1/2015 | Ikeda et al. |
| 2015/0042674 A1 | 2/2015 | Lin |
| 2015/0081559 A1 | 3/2015 | Dua |
| 2015/0146387 A1 | 5/2015 | Lee |
| 2015/0177789 A1 | 6/2015 | Jinbo |
| 2015/0186636 A1 | 7/2015 | Tharappel |
| 2015/0227223 A1 | 8/2015 | Kang et al. |
| 2015/0286813 A1 | 10/2015 | Jakobsson |
| 2015/0301672 A1 | 10/2015 | Kim et al. |
| 2015/0338916 A1 | 11/2015 | Priyantha et al. |
| 2015/0348453 A1 | 12/2015 | Jin et al. |
| 2015/0358315 A1 | 12/2015 | Cronin |
| 2016/0021168 A1 | 1/2016 | Chaudhri et al. |
| 2016/0057139 A1 | 2/2016 | McDonough |
| 2016/0267732 A1 | 9/2016 | Agrfioti et al. |
| 2017/0017313 A1 | 1/2017 | Rakshit |
| 2017/0177096 A1 | 6/2017 | Cheong et al. |
| 2017/0185289 A1 | 6/2017 | Kim |
| 2017/0345365 A1 | 11/2017 | Li |

FOREIGN PATENT DOCUMENTS

| | | |
|---|---|---|
| EP | 2793214 | 10/2014 |
| WO | 2015016160 | 2/2015 |
| WO | 2015/187504 | 12/2015 |
| WO | 2015/195011 | 12/2015 |

OTHER PUBLICATIONS

Gee, Jason Kai Yin, "NonFinal OA", U.S. Appl. No. 15/209,524, filed Jul. 13, 2016; dated Jul. 6, 2018.
Hauber, Jorg, "European Search Report", European Application No. EP 17179859; dated Oct. 9, 2017.
Kanaan, Simon, "NonFinal OA", U.S. Appl. No. 15/209,514, filed Jul. 13, 2016; dated Apr. 2, 2018.
Kanaan, Simon, "NonFinal Office Action", U.S. Appl. No. 15/209,514, filed Jul. 13, 2016; dated Dec. 13, 2018.
Kanaan, Simon, "Notice of Allowance", U.S. Appl. No. 15/209,514, filed Jul. 13, 2016; dated May 20, 2019.
Morris, Euros, "GB Search Report and Written Opinion", GB Application No. GB1710801.0; dated Dec. 20, 2017; Search Date Dec. 18, 2017.
Morris, Euros, "Great Britain Search Report", GB Application No. 1710801.0; dated Dec. 17, 2018.
Rashid, Harunur, "Final Office Action", U.S. Appl. No. 15/209,530, filed Jul. 13, 2016; dated Aug. 23, 2018.
Rashid, Harunur, "NonFinal OA", U.S. Appl. No. 15/209,530, filed Jul. 13, 2016; dated Feb. 22, 2018.
Rashid, Harunur, "Notice of Allowance", U.S. Appl. No. 15/209,530, filed Jul. 13, 2016; dated Jan. 25, 2019,.
Saddington, Aaron, "GB Search and Written Opinion", GB Application No. GB1710820.0; dated Dec. 19, 2017.
Tran, Kim Than Thi, "Final Office Action", U.S. Appl. No. 15/209,519, filed Jul. 13, 2016; dated May 8, 2018.
Tran, Kim Thanh Thi, U.S. Appl. No. 15/209,527, filed Jul. 13, 2016; dated Dec. 12, 2017.
Tran, Kim Thanh Thi, "Final OA", U.S. Appl. No. 15/209,519, filed Jul. 13, 2016; dated Aug. 27, 2018.
Tran, Kim Thanh Thi, "Final OA", U.S. Appl. No. 15/209,527, filed Jul. 13, 2016; dated Jul. 12, 2018.
Tran, Kim Thanh Thi, "Final Office Action", U.S. Appl. No. 15/209,519, filed Jul. 13, 2016; dated Mar. 5, 2019.
Tran, Kim Thanh Thi, "NonFinal OA", U.S. Appl. No. 15/209,519, filed Jul. 13, 2016; dated Oct. 17, 2017.
Zanglein, Ulrike, "PCT Search Report", PCT/US2017/041435; International Filing Date Jul. 11, 2017; dated Sep. 21, 2017.
Gee, Jason Kai Yin, "NonFinal Office Action", U.S. Appl. No. 15/209,524, filed Jul. 13, 2016; dated Oct. 1, 2019.
Morris, Euros, "Office Action", GB1710801.0; dated Feb. 5, 2020.
Steckert, Markus, "Office Action", German Application No. 102017115316.0; dated Mar. 2, 2020.

ELECTRONIC DEVICE WITH GESTURE ACTUATION OF COMPANION DEVICES, AND CORRESPONDING SYSTEMS AND METHODS

CROSS REFERENCE TO PRIOR APPLICATIONS

This application is a continuation application of, and therefore claims priority and benefit under 35 U.S.C. § 120 to, U.S. application Ser. No. 15/209,514, filed Jul. 13, 2016, which is incorporated by reference for all purposes.

BACKGROUND

Technical Field

This disclosure relates generally to electronic devices, and more particularly to portable electronic devices with motion sensors.

Background Art

Mobile electronic communication devices are used by billions of people. The owners of such devices use them for many different purposes including, but not limited to, voice communications, text messaging, Internet browsing, calendar management, commerce such as banking, and social networking.

As these devices become more sophisticated, they can also become more complicated to operate. Illustrating by example, many "smart devices" now come equipped with touch sensitive displays rather than physical keyboards. While touching a surface is considered by some to be a simpler operation than working a complex keyboard, executing complex operations can require the navigation of several different menu tiers or user interface levels.

It would be advantageous to have simplified systems and methods for executing complex operations in modern electronic devices.

Figure 1:
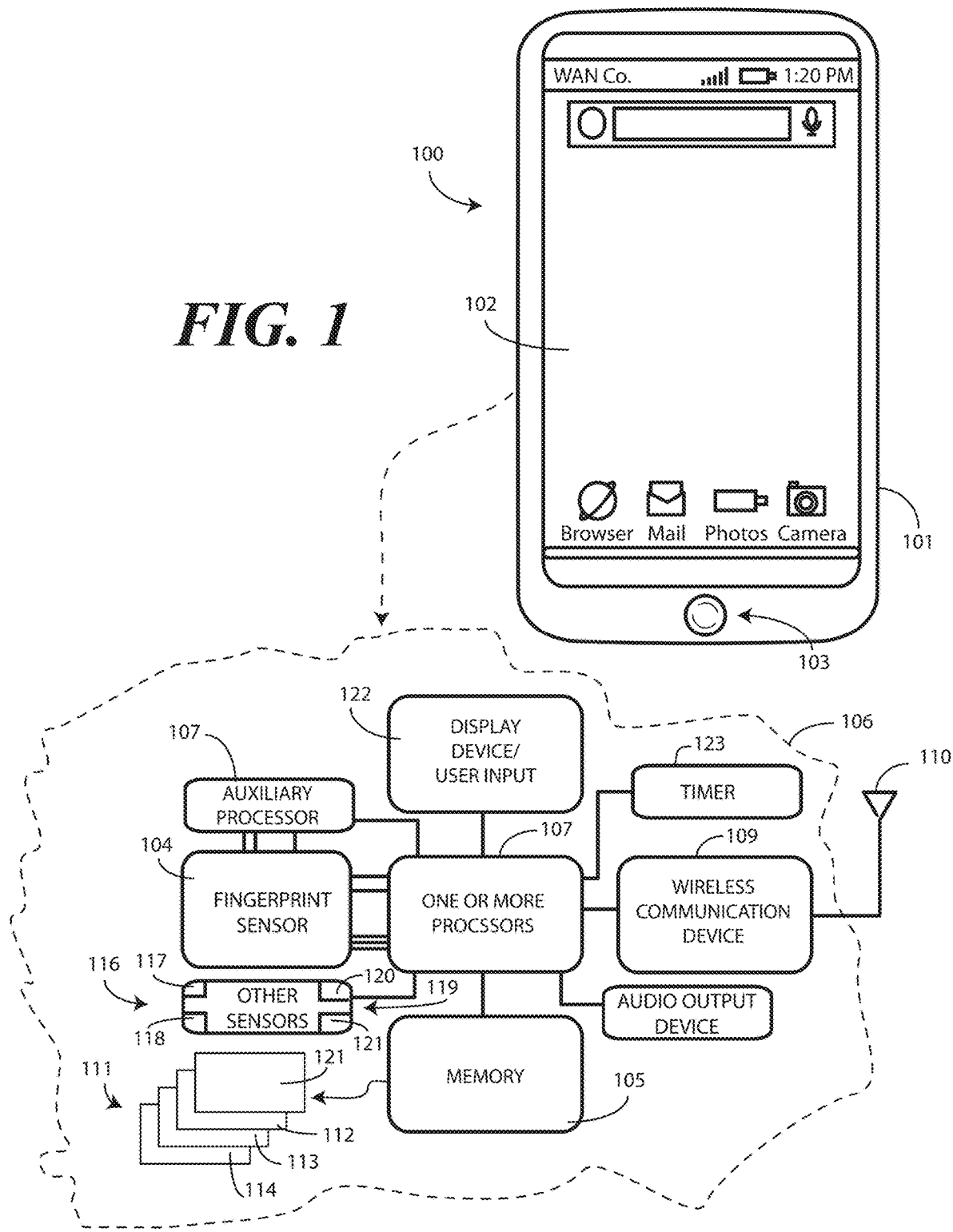
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using biometric and/or motion or proximity sensors to control modes of operation of an electronic device, and in particular to wirelessly actuate companion devices that are operable with the electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods operable on hardware platforms that, when applied to electronic device and/or user interface technology, improve the functioning of the electronic device itself by simplifying companion device actuation to improve the overall user experience by overcoming problems specifically arising in the realm of the recently developed technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling companion devices in response to biometric or gesture or motion input as described herein. The non-processor circuits may include, but are not limited to, a radio receiver, a radio transmitter, signal drivers, clock circuits, power source circuits, and other user input devices. As such, these functions may be interpreted as steps of a method to perform device control companion devices in response to one or more biometric, proximity, and/or motion sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide secure and simple methods of unlocking, actuating, or otherwise controlling companion devices that are operable with an electronic device. Examples of companion devices include music players, televisions, media players, lights, thermostats, appliances, locks, and so forth. For example, embodiments of the disclosure provide secure and simple methods of controlling a music player that is in wireless communication with an electronic device. In one embodiment, a user can identify themselves using a fingerprint sensor. Upon authentication of identification, a user can make a "key turn" simulation gesture to, for instance, turn on a music player operating within a wireless communication radius of the electronic device. Advantageously, this eliminates the need for a user to navigate to an application, and through the application, which may require several touches or user interactions with the display, to perform the same operation.

In one or more embodiments, an electronic device includes a biometric sensor, one example of which is a fingerprint sensor. The biometric sensor is responsible for identifying biometric input received at the biometric sensor. One or more processors, which are operable with the biometric sensor, then identify one or more companion devices operating within a wireless communication radius of the electronic device. As noted above, the companion devices can include music players, wirelessly connected home devices and appliances, health trackers, tools, and so forth.

Once the user is identified from the biometric input, in one embodiment one or more gesture sensors identify a predefined gesture input. The gesture sensors can include motion detectors, proximity detectors, or combinations thereof. One example of a predefined gesture input would be where the user holds the electronic device as if it were a key positioned within a lock, and then twists the electronic device about a major axis. In one embodiment, when this occurs, and the one or more gesture sensors identify the gesture as the predefined gesture input, a wireless communication circuit responsive to the one or more processors delivers an actuation credential to the one companion device. The actuation credential can actuate the companion device, control the companion device, deactuate the companion device, or perform other control operations. Thus, in one embodiment, a user touches a fingerprint sensor and twists the electronic device with a key turn simulation as if it were a key in a lock to actuate a wireless music player to start enjoying smooth jazz during cocktail hour.

Advantageously, embodiments of the disclosure provide a secure and fast way to lock, unlock, actuate, deactuate, or otherwise control a companion device. Where multiple companion devices are operating within the wireless communication radius, embodiments of the disclosure provide methods and systems for selecting between the various devices. Illustrating by example, in one embodiment a list of companion devices is presented on the display from which a user can select a single device prior to making the gesture. In another embodiment, an audible or other notification that there are multiple companion devices paired with the electronic device is delivered, from which a user may deliver an audible command such as "control the music player" prior to making the gesture. Other techniques for alerting the user to the fact that there are multiple companion devices operating within the predefined wireless radius will be obvious to those of ordinary skill in the art having the benefit of this disclosure.

In one or more embodiments, a combination of biometric authentication and gesture control is used to control a companion device. Advantageously, the use of biometric authentication allows multiple users of a single device to control their specific companion devices. Illustrating by example, if a family uses one tablet computer, the one or more processors operating within the tablet computer can identify the family member though biometric identification, thereby allowing the user to control their specific devices without controlling another family member's companion devices. Moreover, the biometric authentication also advantageously allows multiple users of a single electronic device to control differing access levels on a companion device. For instance, parents may not want their children to listen to heavy metal music. Accordingly, when a child is identified, they may be allowed to control a music player, but only to play jazz, bluegrass, or classical music. By contrast, when the biometric sensor identifies a parent, they may be able to control the music player to listen to bone-crushing metal like there is no tomorrow. Other advantages of embodiments of the disclosure will be obvious to those of ordinary skill in the art having the benefit of this disclosure.

In one or more embodiments, the one or more processors executing the operations corresponding to interaction with the biometric sensor, the one or more gesture sensors, and the wireless communication circuit is a low-power, auxiliary processor. As will be described in more detail below, in one or more embodiments an electronic device is equipped with an application processor an auxiliary processor. As used herein, an "application" processor is configured to operate the primary applications of the electronic device, including the operating system environment. A "secondary" or "auxiliary" processor can be configured to operate ancillary or secondary functions. However, in one or more embodiments the auxiliary processor is operable with the biometric sensor, the one or more gesture sensors, and the wireless communication circuit to control companion devices operating within a predefined wireless communication radius in response to biometric input and gesture detection.

In one or more embodiments, the auxiliary processor is a low power processor having lower power consumption than the application processor. For example, in one embodiment the application processor is tasked with providing the operating system environment and for performing application operating functions of an electronic device. Accordingly, the application processor will consume relatively large amounts of power. By contrast, the auxiliary processor may perform a limited number of functions including, but not limited to, controlling companion devices operating within a predefined wireless communication radius in response to biometric input and gesture detection. Thus, in one or more embodiments the auxiliary processor is configured as a smaller component that consumes less power than an application processor. Biometric sensors, gesture sensors, and wireless communication circuits in accordance with embodiments of the disclosure can be configured to work with either device. However, in one or more embodiments control of companion devices in response to biometric and gesture input is advantageously performed by the auxiliary process to save power and extend operational run time of the electronic device. Embodiments of the disclosure contemplate that power savings—and thus longer runtime on a single battery charge—can be achieved by using the auxiliary processor, rather than the application processor, to control companion device operations.

Thus, in one or more embodiments an electronic device includes a biometric sensor such as a fingerprint sensor responsible for identifying fingerprint data. The electronic device can include an application processor and an auxiliary processor, where the auxiliary processor consumes less power than the application processor. In one or more embodiments, the auxiliary processor is configured to determine, with a wireless communication circuit, one or more companion devices in communication with the electronic device. One or more motion sensors, operable with the auxiliary processors, are then responsible for detecting a predefined gesture translating the electronic device in free space. When this occurs, the wireless communication circuit delivers an actuation credential to at least one companion device in response to the one or more motion sensors detecting the predefined gesture.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a palm-top computer, a tablet computer, a gaming device, a media player, or other wireless communication device.

This illustrative electronic device 100 includes a display 102, which in one embodiment is touch-sensitive and defines a primary user interface for the electronic device 100. Users can deliver user input to the display 102 of such an embodiment by delivering touch input from a finger, stylus, or other objects disposed proximately with the display. In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

The explanatory electronic device 100 of FIG. 1 includes a housing 101. Features can be incorporated into the housing 101. In this illustrative embodiment, a biometric sensor 103 disposed along a surface of the housing 101. In one embodiment the biometric sensor 103 is responsible for identifying biometric input received at the biometric sensor 103 to authenticate or otherwise identify a user. Other devices can be disposed along the housing 101 as well. Examples of such devices include an optional camera or speaker port for an audio output device.

In one embodiment, the biometric sensor 103 is a fingerprint sensor 104. However, other types of biometric sensors that can be substituted for the fingerprint sensor 104 will be obvious to those of ordinary skill in the art having the benefit of this disclosure. For example, in other embodiments the biometric sensor 103 can be a voice interface engine. The voice interface engine can include hardware, executable code, and speech monitor executable code in one embodiment. The voice interface engine can include, stored in memory 105, basic speech models, trained speech models, or other modules that are used by the voice interface engine to receive and identify a particular user's voice commands that are received with audio input captured by an audio capture device. In one embodiment, the voice interface engine can include a voice recognition engine.

In another embodiment, the biometric sensor 103 can be an image/gaze detection-processing engine. The image/gaze detection-processing engine can be operable with physical sensors, such as a camera or intelligent imager, to process information detected from a user's gaze to identify the user through facial, eye, or other recognition techniques. The image/gaze detection-processing engine can also be configured to identify the user through facial recognition techniques by capturing photographs of the user. Other examples of biometric sensors 103 suitable for use with embodiments of the disclosure will be obvious to those of ordinary skill in the art having the benefit of this disclosure.

In one embodiment, the fingerprint sensor 104 includes its own processor to perform various functions, including detecting a finger touching the fingerprint sensor 104, capturing and storing fingerprint data from the finger, and optionally identifying or authenticating a user based upon the fingerprint data. In one or more embodiments the processor of the fingerprint sensor 104 can, as one pre-processing step, perform a preliminary authentication of the user by comparing fingerprint data captured by the fingerprint sensor 104 to a reference file stored in memory 105, while secondary authentication is performed by the application processor 107 or auxiliary processor 108. The processor of the fingerprint sensor 104 can be an on-board processor. Alternatively, the processor can be a secondary processor that is external to, but operable with, the fingerprint sensor in another embodiment. One example of which is the auxiliary processor 108. Other configurations will be obvious to those of ordinary skill in the art having the benefit of this disclosure.

In one embodiment, the fingerprint sensor 104 can include a plurality of sensors. The fingerprint sensor 104 can be a complementary metal-oxide-semiconductor active pixel sensor digital imager or any other fingerprint sensor. The fingerprint sensor 104 can be configured to capture, with the plurality of sensors, a live scan of a fingerprint pattern from a finger disposed along its surface, and to store this information as fingerprint data from the user's finger. The fingerprint sensor 104 may also be able to capture one or more images with the plurality of sensors. The images can correspond to an area beneath a surface of skin. The fingerprint sensor 104 can compare the fingerprint data or skin images to one or more references to authenticate a user in an authentication process.

While the biometric sensor 103 is disposed along a front surface of the housing 101 in this illustration, it should be noted that it could alternatively be disposed along the rear surface of the housing 101 in other embodiments. In still other embodiments, the biometric sensor 103 could be disposed beneath the display 102, thereby allowing the user to place a finger on the display 102 for identification.

In one embodiment, where the biometric sensor 103 is a fingerprint sensor 104, the fingerprint sensor 104 can be a single function device. In other embodiments, the fingerprint sensor 104 can be a dual or multifunction device. Illustrating by example, in one embodiment the fingerprint sensor 104 is solely responsible for receiving biometric data from a user and either authenticating the user or determining that the user is unauthorized to use the electronic device 100. This would be a single function fingerprint sensor.

In other embodiments, the fingerprint sensor 104 may be capable of performing multiple functions. Again illustrating by example, in one embodiment the fingerprint sensor 104 can receive biometric data from a user and either authenticate the user or determine that the user is unauthorized to use the electronic device 100. However, the fingerprint sensor 104 may also be configured as a push button. Thus, by touching the fingerprint sensor 104 the user may deliver biometric data only. However, by touching and pressing the fingerprint sensor 104, the fingerprint sensor 104 may both authenticate the user by receiving the biometric data from touch input and perform a second function in response to the push button being depressed.

A block diagram schematic 106 of the electronic device 100 is also shown in FIG. 1. In one embodiment, the electronic device 100 includes one or more processors. In one embodiment, the electronic device includes an application processor 107 and an auxiliary processor 108. One or both of the application processor 107 or the auxiliary processor 108 can include one or more processors. One or both of the application processor 107 or the auxiliary processor 108 can be a microprocessor, a group of processing components, one or more Application Specific Integrated Circuits (ASICs), programmable logic, or other type of processing device. The application processor 107 and the auxiliary processor 108 can be operable with the various components of the electronic device 100. Each of the application processor 107 and the auxiliary processor 108 can be configured to process and execute executable software code to perform the various functions of the electronic device 100. A storage device, such as memory 105, can optionally store the executable software code used by the application processor 107 or the auxiliary processor 108 during operation.

As noted above, in one or more embodiments the auxiliary processor 108 is a low power processor having lower power consumption than the application processor 107. For example, in one embodiment the application processor 107 is tasked with providing the operating system environment and for running various applications operating on the electronic device 100. Accordingly, the application processor 107 can consume relatively large amounts of power.

For example, in one embodiment, the application processor 107 is responsible for running the operating system environment 111. The operating system environment 111 can include a kernel 112 and one or more drivers, and an application service layer 113, and an application layer 114. The operating system environment 111 can be configured as executable code stored in memory 105.

The application layer 114 can be responsible for executing application service modules. The application service modules may support one or more applications or "apps." The applications of the application layer 114 can be configured as clients of the application service layer 113 to communicate with services through application program interfaces (APIs), messages, events, or other inter-process communication interfaces.

By contrast, the auxiliary processor 108 may perform a limited number of functions including, but not limited to, controlling companion devices operating within a predefined wireless communication radius in response to biometric input and gesture detection. Thus, in one or more embodiments the auxiliary processor 108 is configured as a smaller component that consumes less power than an application processor 107. Where control of companion devices in response to biometric and gesture input is advantageously performed by the auxiliary processor 108, this saves power and extends operational run time of the electronic device 100. Advantageously, power savings are achieved by using the auxiliary processor 108, rather than the application processor 107, to control companion device operations in one or more embodiments.

In this illustrative embodiment, the electronic device 100 also includes a wireless communication circuit 109 that can be configured for wired or wireless communication with one or more companion devices operating within a predefined wireless communication radius. The wireless communication circuit 109 can also be operable to communicate across one or more networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The wireless communication circuit 109, in one embodiment, may also utilize wireless technology for communication across networks having a limited wireless communication radius. Such networks include, but are not limited to, peer-to-peer or ad hoc communications such as HomeRF, Bluetooth and IEEE 802.11 (a, b, g or n), and other forms of wireless communication such as infrared technology. The wireless communication circuit 109 can include wireless communication circuitry, one of a receiver, a transmitter, or transceiver, and one or more antennas 110.

One or more other sensors 115 can be operable with one or more of the application processor 107, the auxiliary processor 108, or combinations thereof. In one embodiment, the other sensors 115 include motion sensors 116. The motion sensors 116 can include one or more accelerometers 117 or gyroscopes 1118. For example, an accelerometer 117 may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope 118 can be used in a similar fashion. An altimeter can be included as one of the motion sensors 116 as well.

Regardless of the type of motion sensors 116 that are used, in one embodiment the motion sensors 116 are also operable to detect movement, and direction of movement, of the electronic device 100 by a user. In one or more embodiments, the other sensors 115 and the motion sensors 116 can each be used to detect motion when a user pivots, rotates, elevates, translates, or otherwise moves the electronic device 100. This information can be used to identify whether the user is executing a motion corresponding to a predefined gesture. Accordingly, in one or more embodiments, the motion sensors 116 and/or proximity sensors 119 are collectively referred to as "gesture sensors."

Illustrating by example, in one embodiment when the electronic device 100 is held in a user's hand, the user may make certain movements in free space such as that of performing a key turn simulation. The motion sensors 116 can be used to detect such motions and to determine whether they correspond to predefined gesture profiles stored in memory 105. In one embodiment, the auxiliary processor 108 then extracts parametric data from electronic signals delivered by these motion sensors 116. By comparing the parametric data to a reference file stored in memory 105, the auxiliary processor 108 can identify whether the user's motion in free space corresponds to a predefined gesture. The auxiliary processor 108 can use this information to control one or more companion devices as will be described in more detail below.

In one or more embodiments, the other sensors 115 also include one or more proximity sensors 119. In one embodiment, the one or more proximity sensors 119 include one or more proximity sensor components 120. The proximity sensors 119 can also include one or more proximity detector components 121. In one embodiment, the proximity sensor components 120 comprise only signal receivers. By contrast, the proximity detector components 121 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 120 comprises an infrared signal receiver so as to be able to detect infrared emissions from a person. Accordingly, the proximity sensor component 120 requires no transmitter since objects disposed external to the housing 101 deliver emissions that are received by the infrared receiver. As no transmitter is required, each proximity sensor component 120 can operate at a very low power level. Such infrared signal receivers can operate with a total current drain of just a few microamps (~10 microamps per sensor). By contrast, a proximity detector component 121, which includes a signal transmitter, may draw hundreds of microamps to a few milliamps.

In one embodiment, one or more proximity detector components 121 can each include a signal receiver and a corresponding signal transmitter. The signal transmitter can transmit a beam of infrared light that reflects from a nearby object and is received by a corresponding signal receiver. The proximity detector components 121 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 100.

In one embodiment, the auxiliary processor 108 may generate commands or execute control operations based on information received from the motion sensors 116, the one or more proximity sensors 119, the fingerprint sensor 104 or other biometric sensor 103, or combinations thereof. The auxiliary processor 108 may also generate commands or execute control operations based upon information received from one or a combination of these sensors. Moreover, the auxiliary processor 108 may process the received sensor information alone or in combination with other data, such as the information stored in the memory 105.

The one or more other sensors 115 may additionally include a microphone, an earpiece speaker, a second loudspeaker, and/or a component of a user interface 122, such as a button. The one or more other sensors 115 may also include key selection sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the housing 101 can be used to determine whether the electronic device 100 is being touched at side edges or major faces of the electronic device 100 are being performed by a user. The touch sensors can include surface and/or housing capacitive sensors in one embodiment. The other sensors 115 can also include audio sensors and video sensors (such as a camera).

Many of the sensors in the electronic device 100 can be used to detect movement, gestures, or other user input. For example, the one or more proximity sensors 119 can detect the gesture of a user waving a hand above the display 102. In another embodiment, the user can deliver gesture input by touching the display 102. In yet another embodiment, the accelerometer 117 can detect gesture input from a user lifting, shaking, translating, rotating, pivoting, or otherwise deliberately moving the electronic device 100. In yet other embodiments, the user can deliver gesture input by rotating or changing the orientation of the electronic device 100, which can be detected by multiple accelerometers 117 or a gyroscope 118. It should be clear to those of ordinary skill in the art having the benefit of this disclosure that additional sensors can be included with the other sensors shown in FIG. 1.

A timer 123 can be operable with one or more of the application processor 107 or the auxiliary processor 108. One or both of the application processor 107 or the auxiliary processor 108 can initiate the timer 123 during control operations or method steps. When the timer 123, in one embodiment one or more of the application processor 107 or the auxiliary processor 108 can perform certain control operations when events do, or do not, transpire prior to expiration of the timer 123. Other uses for the timer 123 will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
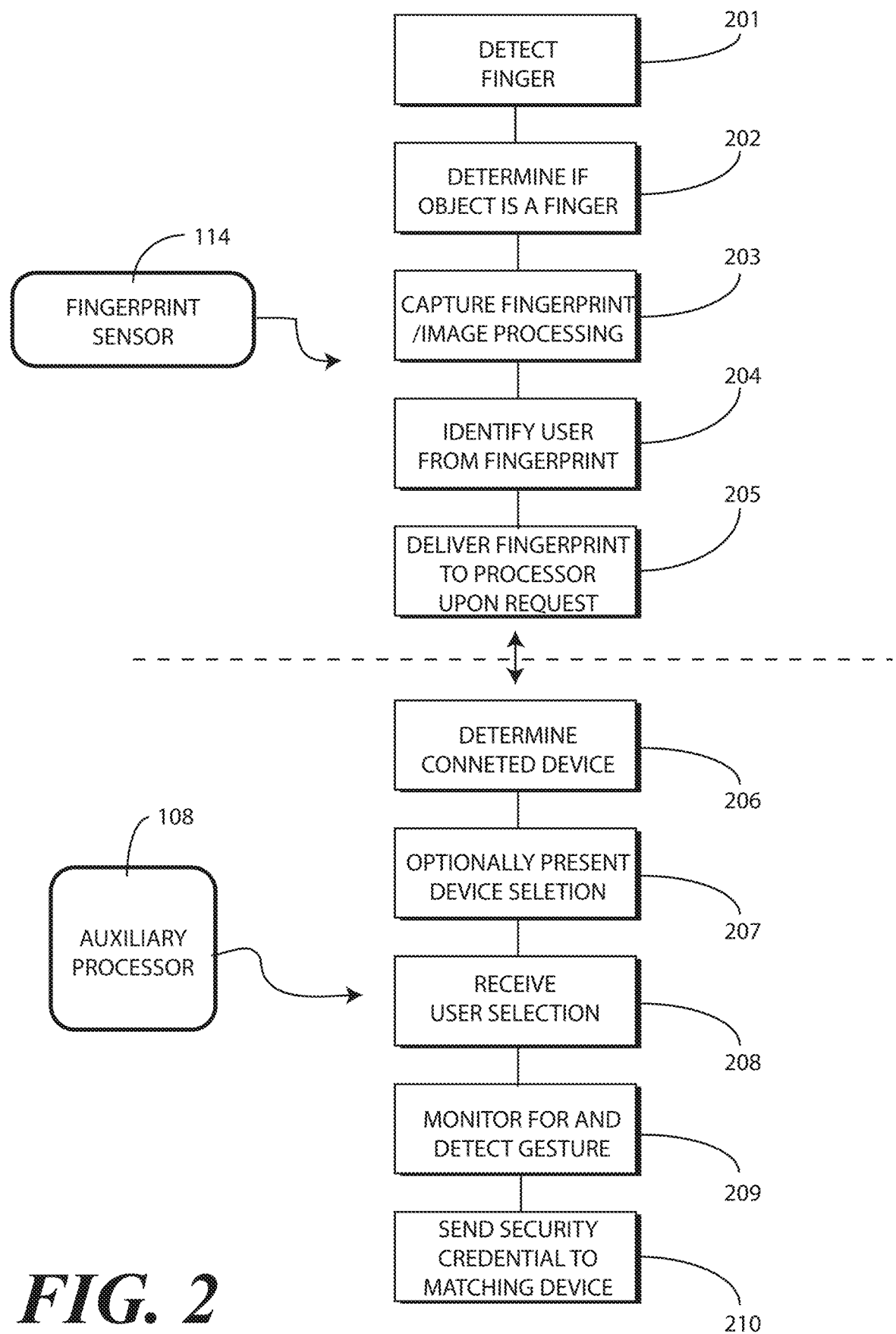
FIG. 2 illustrates one explanatory schematic block diagram with corresponding functional operations in accordance with one or more embodiments of the disclosure.

Turning now to FIG. 2, illustrated therein are some of the interactions that can occur between the fingerprint sensor 104 and the auxiliary processor 108 in accordance with one or more embodiments of the disclosure. It should be noted that where no auxiliary processor 108 is included, the auxiliary processor functions shown in FIG. 2 can be performed by the application processor (107) of the electronic device (100) instead. Similarly, where an auxiliary processor 108 is included, but is tasked with performing other operations, the application processor (107) of the electronic device (100) can optionally perform one or more of the auxiliary processor functions shown in FIG. 2 as well.

In one embodiment, the fingerprint sensor 104 is to detect 201 a finger proximately located with the fingerprint sensor 104. As a part of the detection process, the fingerprint sensor 104 can enter an input reception mode upon an object contacting the surface of the fingerprint sensor 104.

In one embodiment, the fingerprint sensor 104 can optionally be configured to determine 202 that the object touching or otherwise proximately located with the fingerprint sensor 104 is actually a finger and not an object incapable of authentication. Where the object is a finger, the fingerprint sensor 104 can then capture 203 fingerprint data from the finger and perform other pre-processing such as noise filtering and so forth.

In one or more embodiments, the fingerprint sensor 104 is further to authenticate or identify 204 a user from the fingerprint data received at 203. This step can optionally be performed by the auxiliary processor 108 as well. For example, in one embodiment, one of the fingerprint sensor 104 or the auxiliary processor 108 can perform a matching function. The fingerprint sensor 104 or the auxiliary processor 108, after having received the fingerprint data, can then perform a matching process to determine whether the fingerprint data substantially matches reference data stored in memory. In one embodiment, upon receiving a request from the auxiliary processor 108 for the fingerprint data, the fingerprint sensor 104 can deliver 205 the fingerprint data to the auxiliary processor 108.

The auxiliary processor 108, meanwhile, can work with the wireless communication circuit (109) to be responsible for identifying 206 one or more companion devices operating within a wireless communication radius of the electronic device (100). "Companion devices" refer to devices that are in communication with, or alternatively are paired with using a local area network protocol such as Bluetooth.sup™, with the electronic device (100).

In some situations, the auxiliary processor 108 will identify 206 multiple companion devices operating within the wireless communication radius defined by the particular protocol with which the wireless communication circuit (109) is communicating. Where this is the case, the auxiliary processor 108 can optionally provide 207 an identification of the multiple companion devices with a user interface (122) of the electronic device (100). Illustrating by example, in one embodiment the auxiliary processor 108 can present a list of the multiple companion devices along the display (102). In another embodiment, the auxiliary processor 108 can deliver identification of the multiple companion devices audibly through a loudspeaker. Still other techniques for providing 207 an identification of the multiple companion devices will be obvious to those of ordinary skill in the art having the benefit of this disclosure.

Upon identifying multiple companion devices operating within the wireless communication radius, the auxiliary processor 108 can receive 208 a user selection of the at least one companion device. As with the identification of the multiple companion devices, the auxiliary processor 108 can receive 208 the selection in various ways. In one embodiment, where the auxiliary processor 108 presents a list of the multiple companion devices along the display (102), a selection can be received 208 when a user touches a user actuation target corresponding to a particular device. In another embodiment, where the auxiliary processor 108 delivers the identification of the multiple companion devices audibly through a loudspeaker, the auxiliary processor 108 may receive the selection as voice input through a microphone. In still other embodiments, different predefined gestures may be assigned to different companion devices. Accordingly, a user may make a selection by executing one predetermined gesture instead of another predetermined gesture. Other techniques for receiving 208 a selection of one companion device from an identification of multiple companion devices will be obvious to those of ordinary skill in the art having the benefit of this disclosure.

The auxiliary processor 108 can also, working in tandem with the one or more gesture sensors, be they motion sensors (116), proximity sensors (119), or other sensors, monitor for and identify 209 a predefined gesture. Where this occurs, the auxiliary processor can cause the wireless communication circuit (109) to deliver 210 an actuation credential to at least one companion device upon the one or more gesture sensors and/or auxiliary processor identifying 209 the predefined gesture input. This process will be explained in more detail below with reference to the remaining figures.

Figure 3:
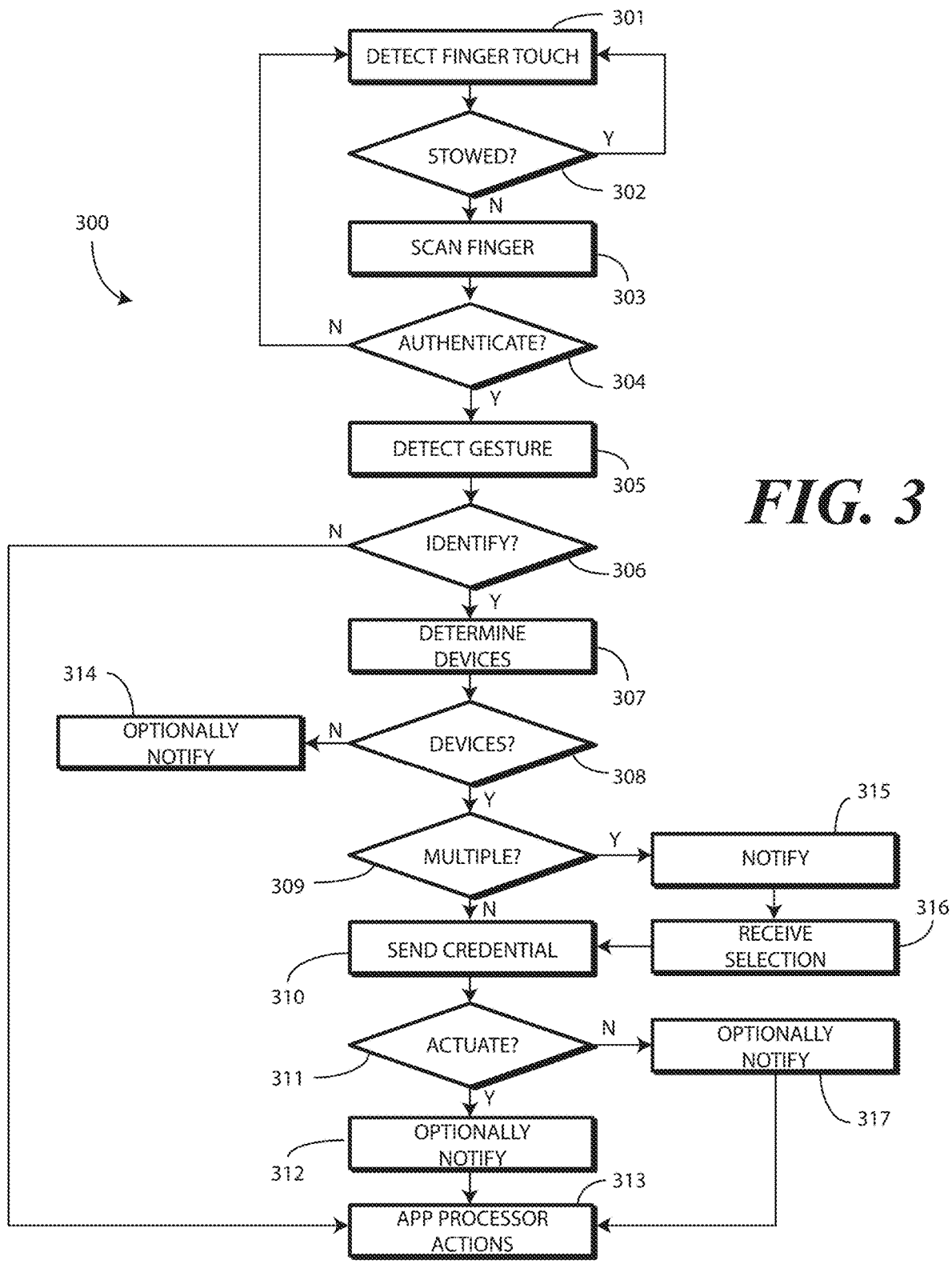
FIG. 3 illustrates one explanatory method in accordance with one or more embodiments of the disclosure.

Now that the various hardware components have been described, attention will be turned to methods and use cases in accordance with one or more embodiments of the disclosure. Turning now to FIG. 3, illustrated therein is one explanatory method 300 for controlling one or more companion devices in accordance with one or more embodiments of the disclosure.

At step 301 a fingerprint sensor detects an object touching the fingerprint sensor. At decision 302, one or more processors operable with the fingerprint sensor determine whether the electronic device is docked or stowed. As noted above, embodiments of the disclosure control companion devices in response to biometric or gesture or motion input. Where the electronic device is docked or stowed, embodiments of the disclosure contemplate that gesture or motion within free space is unlikely to occur. Accordingly, where the electronic device is docked or stowed, as determined at decision 302, normal functions—such as actuating the display or launching an application—may be performed rather than any companion device control. Thus, where optional decision 302 is included, in one embodiment the method 300 returns to step 301 when the electronic device is docked or stowed.

At step 303, the fingerprint scanner scans the finger to receive fingerprint data from the finger. At step 303, the method 300 further performs an authentication process on the finger as described above. Said differently, in one embodiment, step 303 includes the biometric sensor identifying biometric input to authenticate a user. Where a user is identified from the fingerprint data, the method proceeds to step 305. Otherwise, the method returns to step 301.

At step 305, one or more gesture sensors detect one or more gestures. In one embodiment, the gestures comprise motion of the electronic device itself, as detected by one or more motion sensors. In other embodiments, the gestures comprise motion of an object near the electronic device, as detected by one or more proximity sensors. For example, in the latter case the one or more proximity sensors may detect a user waving a hand or making another gesture above the electronic device instead of by moving the electronic device itself.

At decision 306, the method 300 attempts to identify the gesture as a predefined gesture. In one embodiment, this can be accomplished by comparing extracted parametric data from the detected gesture motion and comparing it with a profile stored in memory. Where the gesture is identified or authenticated, the method 300 can continue. However, where the gesture is not authenticated or identified, the method 300 can move to step 313, where the processors of the electronic device take other actions such as informing the person that no predefined gesture has been detected.

Assuming the user is identified, in one embodiment the method 300 moves to step 307 where a number of companion devices operating within a wireless communication radius is determined. At decision 308, the method determines whether any companion devices have been detected. Where none have, the method 300 can optionally notify the user through a user interface that no companion devices have been detected at step 314.

Where at least one companion device has been detected, decision 309 determines whether one companion device or multiple companion devices have been detected. Where one, the method proceeds to step 310. However, where there are multiple companion devices detected, in one embodiment the method 300 optionally notifies the user of this fact at step 315. Methods for providing this notification have been described above with reference to FIG. 2. At step 316, the method 300 receives a user selection of at least one of the companion devices. Methods for receiving this selection have also been described above.

At step 310, the method 300 delivers an actuation credential to at least one companion device. The actuation credential can take a number of different forms. In its most basic form, the actuation credential comprises an electronic message commanding or authorizing the companion device to take a particular action. Examples of such actions include turning ON, turning OFF, selecting content to play, fast forwarding, rewinding, skipping, and so forth. The actions will vary based upon the application and the type of companion device. In other embodiments, the actuation credential can comprise keys or tokens that provide a security or authentication notification. For example, the actuation credential may indicate both an action that the companion device should preform and an indication that a particular user has been identified. Other types of actuation credentials will be obvious to those of ordinary art having the benefit of this disclosure.

At optional decision 311, the method 300 can determine whether the command set forth in the actuation credential has been successful. For example, the companion device may send an acknowledgement message in response to receiving the actuation credential indicating whether the command was successful. In one or more embodiments, the method 300 may optionally notify the user regarding whether the command set forth in the actuation credential was successful at step 312.

Figure 4:
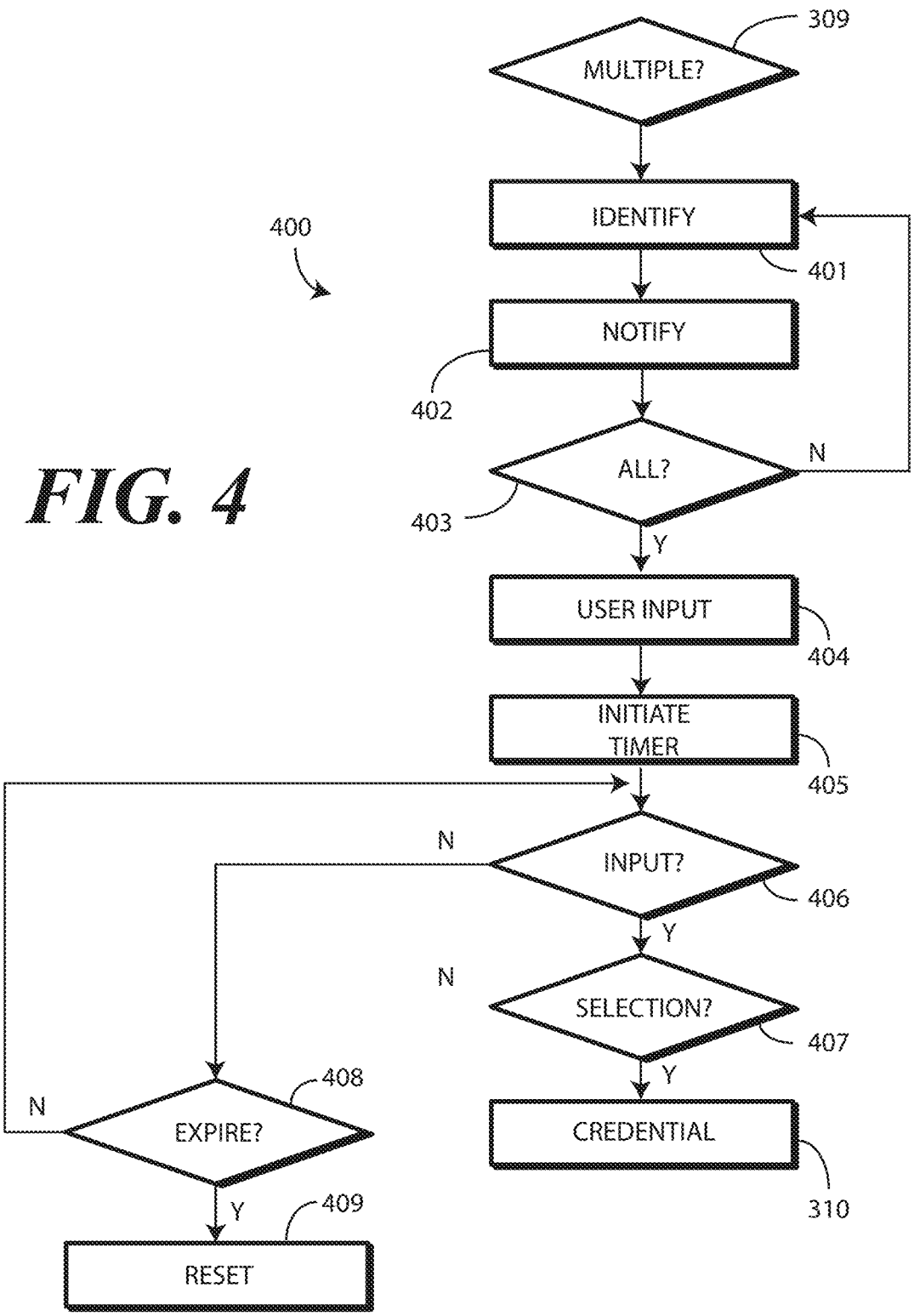
FIG. 4 illustrates another explanatory method in accordance with one or more embodiments of the disclosure.

As noted above with reference to FIG. 2, when multiple companion devices are found, there are a variety of ways of receiving a user selection regarding which companion device should receive the actuation credential. Such methods are shown in FIG. 4. Illustrating by example, an electronic device may present a list of the multiple companion devices along its display. A selection can then be received when a user touches a user actuation target corresponding to a particular device. Alternatively, the electronic device may present the list of multiple devices as audible output from a loudspeaker. A selection may be received as voice input through a microphone. Methods for doing either are depicted in FIG. 4. Still other techniques for providing an identification of the multiple companion devices, and receiving a selection therefrom of one or more companion devices, will be obvious to those of ordinary skill in the art having the benefit of this disclosure.

Turning now to FIG. 4, at decision 309, the method 400 detects that multiple companion devices are operable with an electronic device within a wireless communication radius. At step 401, the method 400 communicates with one of the companion devices to obtain its identity. For example, step 401 can include transmitting a wireless communication message to a companion device requesting an identifier and then receiving that identifier. As shown at decision 403, this process can repeat until all companion devices have been identified.

At step 402, the method 400 identifies the companion devices to the user. In one embodiment, step 402 presents a list of the multiple companion devices along its display. In another embodiment, step 402 presents the list of multiple devices as audible output from a loudspeaker. This step 402 can occur as devices are identified, i.e., each time step 401 is performed, in one embodiment. However, in other embodiments this step 402 can occur once all of the companion devices have been identified, e.g., after decision 403.

At step 404, the method 400 monitors for user input to select one or more of the companion devices. In one embodiment, step 404 comprises a user touching a user actuation target on a display corresponding to a particular device. In another embodiment, step 404 receives voice input through a microphone.

In one embodiment, a user selects a single companion device at step 404. In another embodiment, the user selects multiple devices at step 404. A user may select multiple companion devices, for example, where those companion devices are lights or loudspeakers and the user wishes to turn them all ON or OFF simultaneously. Alternatively, the user may select a single companion device if, for instance, the company device is a thermostat and the user wants to change the temperature. As noted above, step 404 fan monitor for use touch user input, audio user input, gesture user input, or other user input to determine a selection by a user.

In one or more embodiments, the method 400 starts a timer at step 405. Embodiments of the disclosure contemplate that there may be situations where no companion device is selected. For example, a user may not find a companion device that they thought was paired with the electronic device. Alternatively, the user may change their mind or otherwise decide not to deliver a control operation to the companion device. Accordingly, at decision 406 the method 400 can determine whether user input is received. This can continue until the timer expires, as determined at decision 408. Where no user selection is received prior to expiration of the timer, the system can reset at step 409.

By contrast, where user input is received, the method 400 can determine if it corresponds to one or more companion devices being selected at decision 407. Where it does, an actuation credential can be delivered to the one or more companion devices to control the same.

Figure 5:
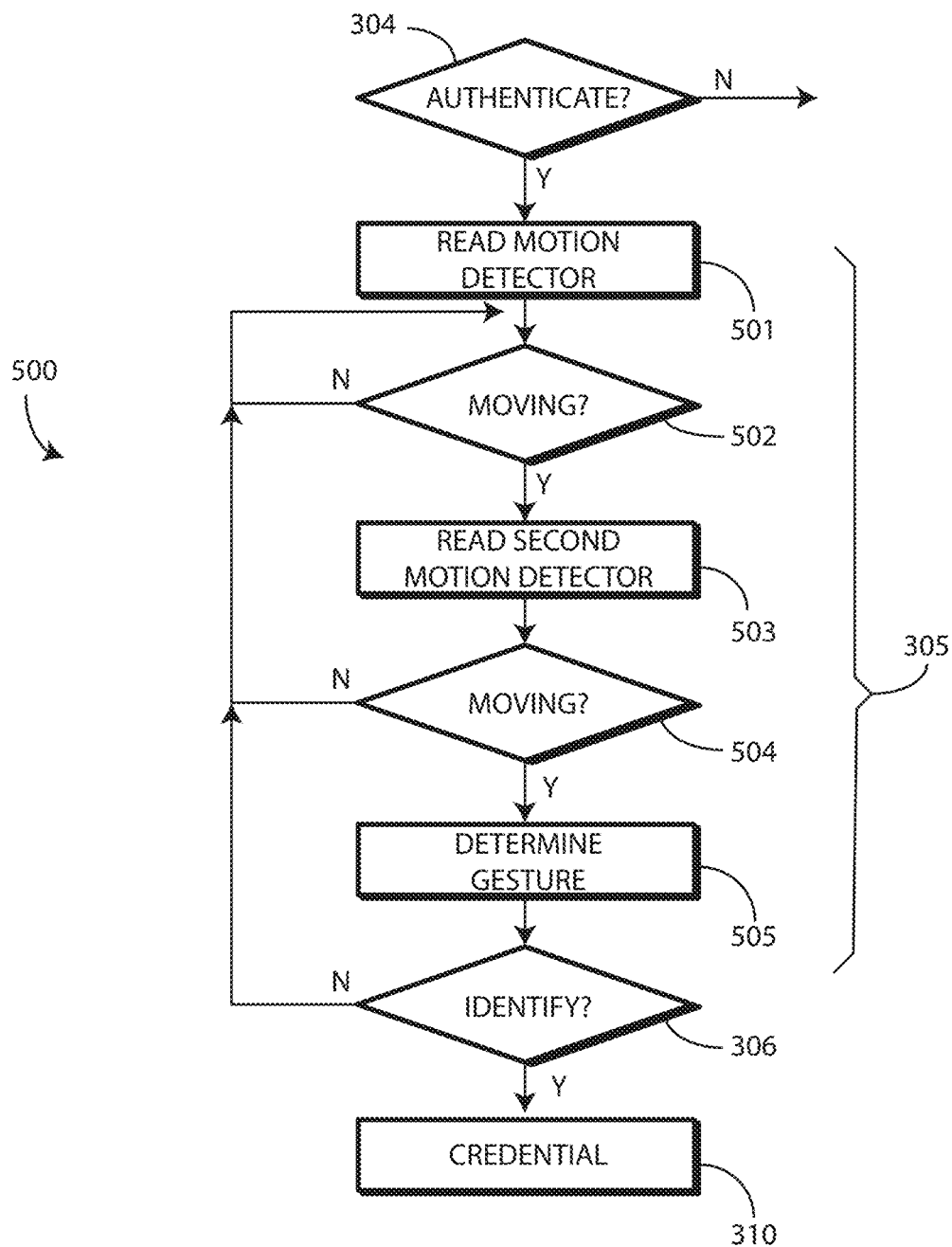
FIG. 5 illustrates yet another explanatory method in accordance with one or more embodiments of the disclosure.

Turning now to FIG. 5, illustrated therein is a sub-method 500 for detecting a gesture as noted at step (305) of FIG. 5. Once a user has been authenticated, as determined at decision 304, the method 500 monitors a first motion detector at step 501. In one embodiment, the first motion detector is an accelerometer. From the parametric data delivered by the accelerometer, the method 500 determines whether the electronic device is moving at decision 502.

Where it is, in one embodiment the method 500 can then read a second motion detector at step 503. In one embodiment, the second motion detector is a gyroscope. From the parametric data delivered by the gyroscope, the method 500 can determine if the electronic device is changing its orientation, e.g., rotating or pivoting, in free space at decision 504. Illustrating by example, in one embodiment decision 504 includes determining if a major axis of the electronic device is changing in excess of a predetermined rate, or whether the major axis has deviated from a predefined reference by more than a predetermined amount. Decision 504 may query whether, for example, the "y-axis" reading of the accelerometer is greater than ten or less than minus ten to determine whether the orientation of the electronic device is changing in free space.

At step 505, the parametric data from the various motion sensors can be compared to predefined gesture data stored in a memory of the electronic device to determine whether a user is making a predefined gesture. Whether the gesture can be identified is determined at decision 306 as previously described. Where the gesture is identified, an actuation credential is sent at step 310.

Figure 6:
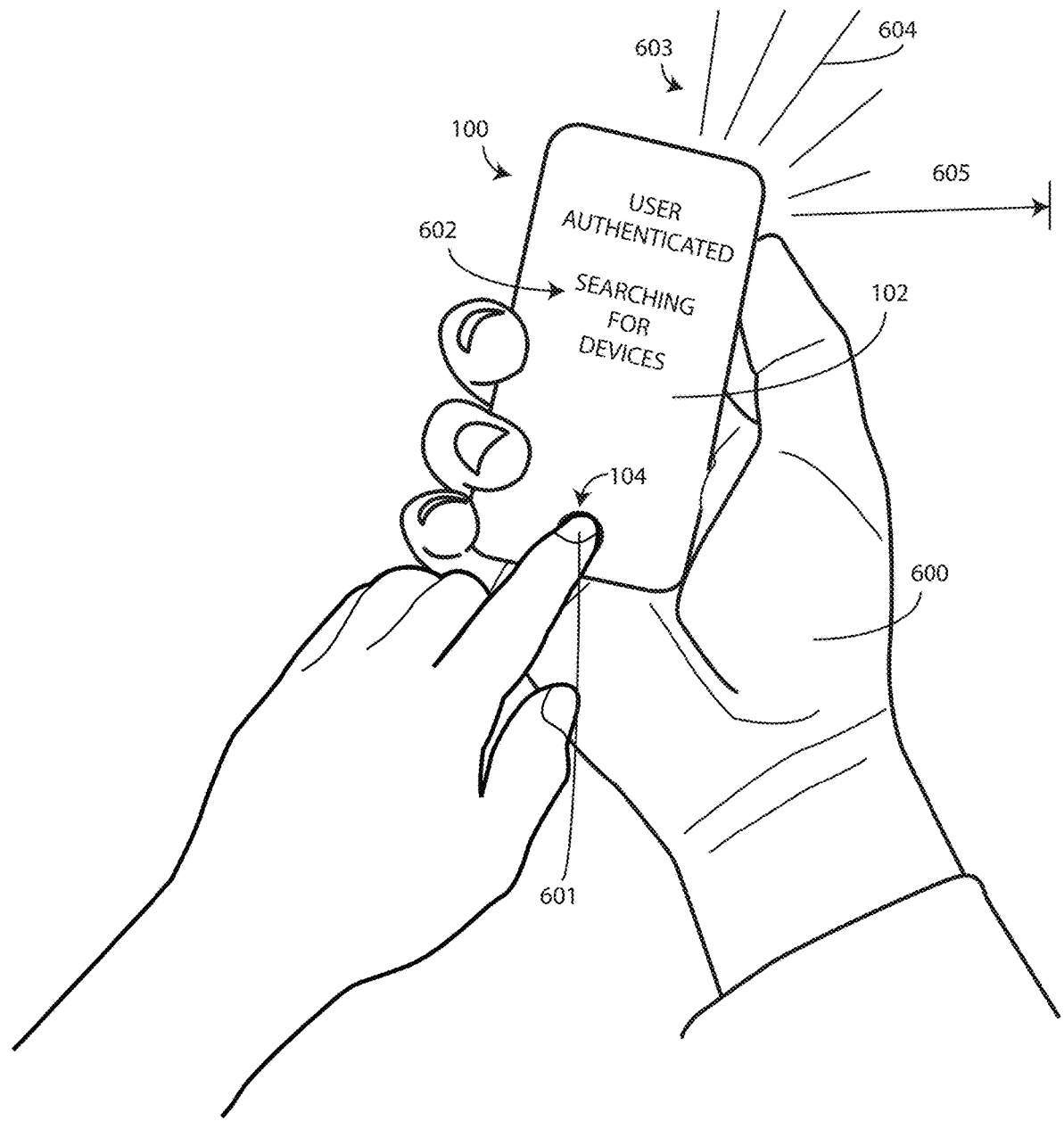
FIG. 6 illustrates one or more method steps for an explanatory system in accordance with one or more embodiments of the disclosure.

To further illustrate the unique features of embodiments of the disclosure, the various method steps of FIGS. 2-5, and hardware components of FIG. 1, will now be described with the electronic device in use. Turning now to FIG. 6, a user 600 places their finger 601 on a fingerprint sensor 104 of an electronic device. When this occurs, the fingerprint sensor 104 identifies fingerprint data from the user's finger 601 to authenticate the user. As noted above, in one or more embodiments the electronic device 100 includes both an application processor (107) and an auxiliary processor (108). In one embodiment, the auxiliary processor then determines 603, through the exchange of wireless communication signals 604 from a wireless communication circuit (109), whether one or more companion devices are in communication with the electronic device within a wireless communication radius 605. In one or more embodiments, a notification 606 can be presented on the display 102 to let the user 600 know what is occurring.

Figure 7:
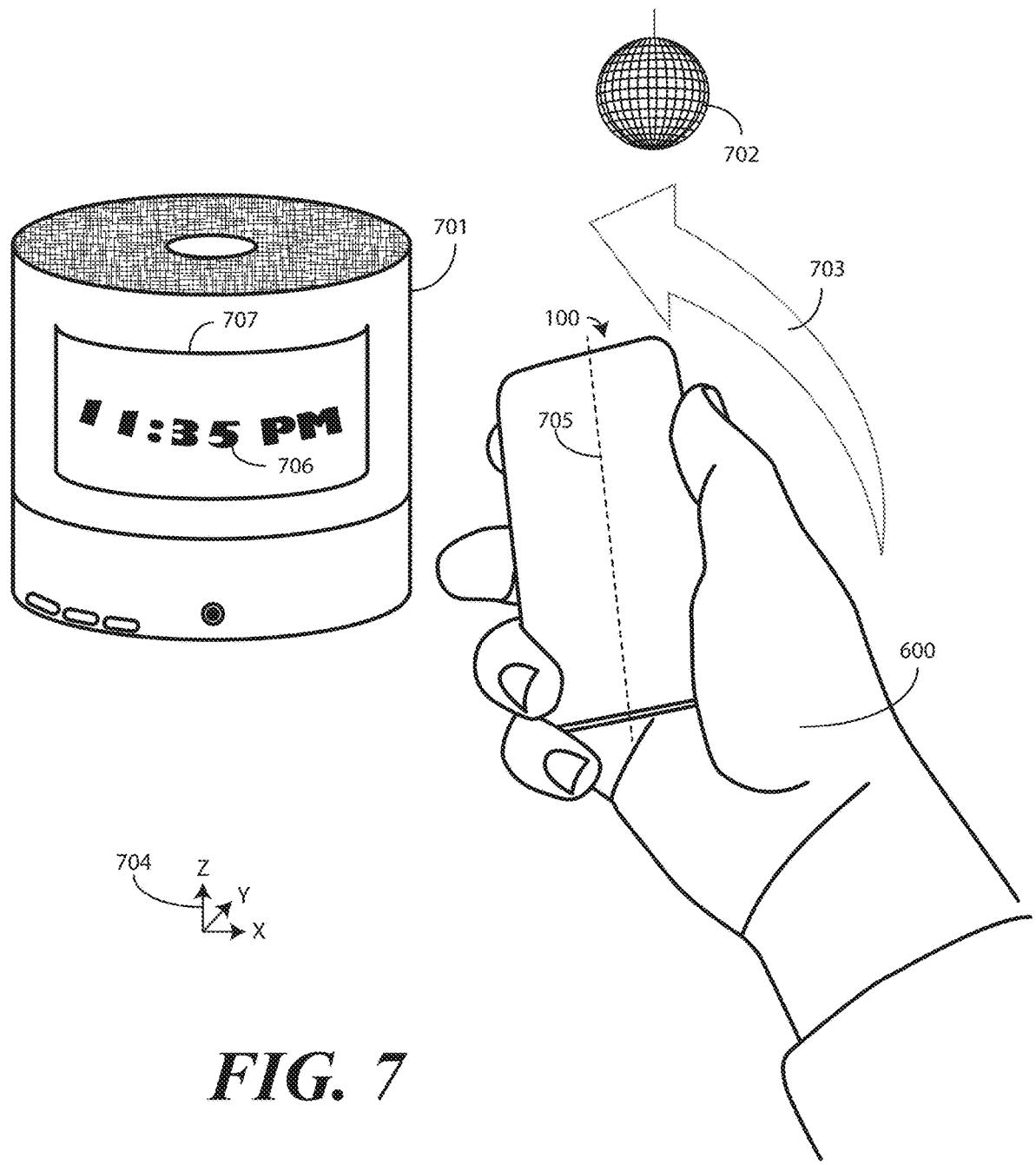
FIG. 7 illustrates one or more method steps for an explanatory system in accordance with one or more embodiments of the disclosure.

Turning to FIG. 7, the electronic device 100 has detected two companion devices 701,702 operating within the wireless communication radius (605). Here, a first companion device 701 is a music player that is paired with the electronic device 100 by a Bluetooth.sup™ connection. The second companion device 702 is a disco strobe light that is communicating with the electronic device 100 through a router in a Wi-Fi network. These are examples of companion devices 701,702 only. Others will be readily apparent to those of ordinary skill in the art having the benefit of this disclosure.

Note that the electronic device 100 has detected two companion devices 701,702. As noted above, when this occurs, the electronic device 100 can identify a user selection in a variety of ways. A list of the companion devices 701,702 could be presented on the display from which the user 600 could make a selection by touch. Alternatively, an audible list of the companion devices 701,702 could be delivered through a loudspeaker, with the user 600 making a choice with a voice command.

In the embodiment of FIG. 7, a more intuitive option is illustrated. In this embodiment, the user 600 makes the selection by way of a predefined gesture input. Specifically, as shown in FIG. 7, the user 600 translates 703 the electronic device 100 in free space 704 from a first position, shown in FIG. 6, to a second position, shown in FIG. 7. This orients a major axis 705 of the electronic device 100 toward companion device 701 the user 600 wishes to select. Accordingly, the major axis 705 of the electronic device 100 is effectively pointed toward the music player. The auxiliary processor (108) can detect this by determining an orientation of the electronic device 100 in free space 704 and comparing it with a stored map of the room in which the user 600 is located.

As shown in FIG. 7, the music player is initially OFF. The user 600 can see this because a clock 706 is presented on a display 707 of the music player. However, in this example, the user 600 wants to turn the music player ON.

Figure 8:
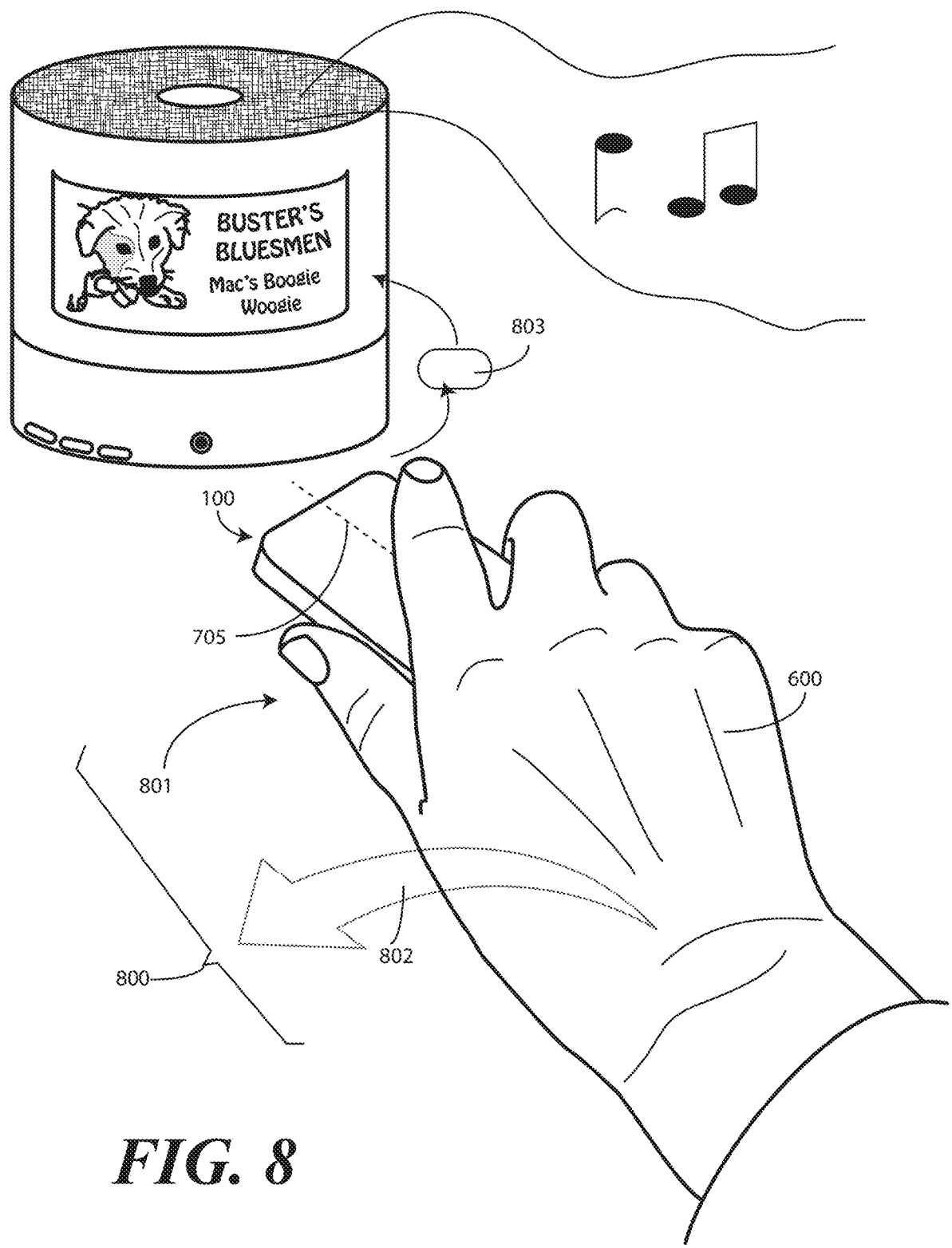
FIG. 8 illustrates one or more method steps for an explanatory system in accordance with one or more embodiments of the disclosure.

Turning now to FIG. 8, since the user 600 wants to actuate the music player, the user 600 executes a key turn simulation 801 by rotating 802 the electronic device 100 about a major axis 705. This simulates the turning of a key once it is in a lock. This is detected by one or more motion sensors (116). Said differently, the motion sensors (116) of the electronic device 100 detect the predefined gesture 800 translating the electronic device 100 in free space 704 and identify it by comparing parametric data corresponding to the predefined gesture 800 with reference data stored in memory (105).

When this occurs, the auxiliary processor (108) can control the wireless communication circuit (109) to cause it to wirelessly deliver an actuation credential 803 to the music player. In one or more embodiments, this unlocks the companion device 701. In this illustrative embodiment, the actuation credential 803 causes the music player to actuate and start playing "Mac's Boogie Woogie" by the infamous Buster and his Bluesmen. As shown, by making a simple, intuitive predefined gesture 800, the user 600 has not only selected the music player, but has turned it on as well.

In the illustrative embodiment of FIGS. 6-8, the user 600 selected and unlocked a companion device 701 by orienting a major axis 705 of the electronic device 100 toward the companion device 701 via a translation 703 of the electronic device 100 in free space 704 between a first position (FIG. 6) and a second position (FIG. 7), and rotating 802 the electronic device 100 about the major axis 705 to perform a key turn simulation 801. While this is one option for performing these tasks, embodiments of the disclosure are not so limited. Numerous other techniques have been described above for performing these operations, and numerous others will be obvious to those of ordinary skill in the art having the benefit of this disclosure.

Illustrating by example, turning now to FIG. 8, rather than making a gesture that translates the electronic device 100 in free space (704), the user 600 makes a gesture 901 by waving a hand 902 above the electronic device 100. In one or more embodiments, the proximity sensors (119) detect this gesture 901 despite the fact that it is above the display 102. Thus, in FIG. 8, the predefined gesture input comprises a predefined motion of an object, i.e., the gesture 901 of the user's hand 902), as detected by the one or more proximity sensors (119), about the electronic device 100. In one embodiment, the auxiliary processor (108) can control the wireless communication circuit (109) to cause it to wirelessly deliver an actuation credential 803 to the music player. Again the user 600 is able to listen to "Mac's Boogie Woogie" by the infamous Buster and his Bluesmen, albeit by a different technique. While in this illustration it is easy to determine that the actuation credential 803 was received due to the fact that music is playing, in one or more embodiments the auxiliary processor (108) optionally provides a notification 903 on a user interface, e.g. the display 102 in this example, that the actuation credential 803 was delivered by the wireless communication circuit (109) of the electronic device.

Figure 9:
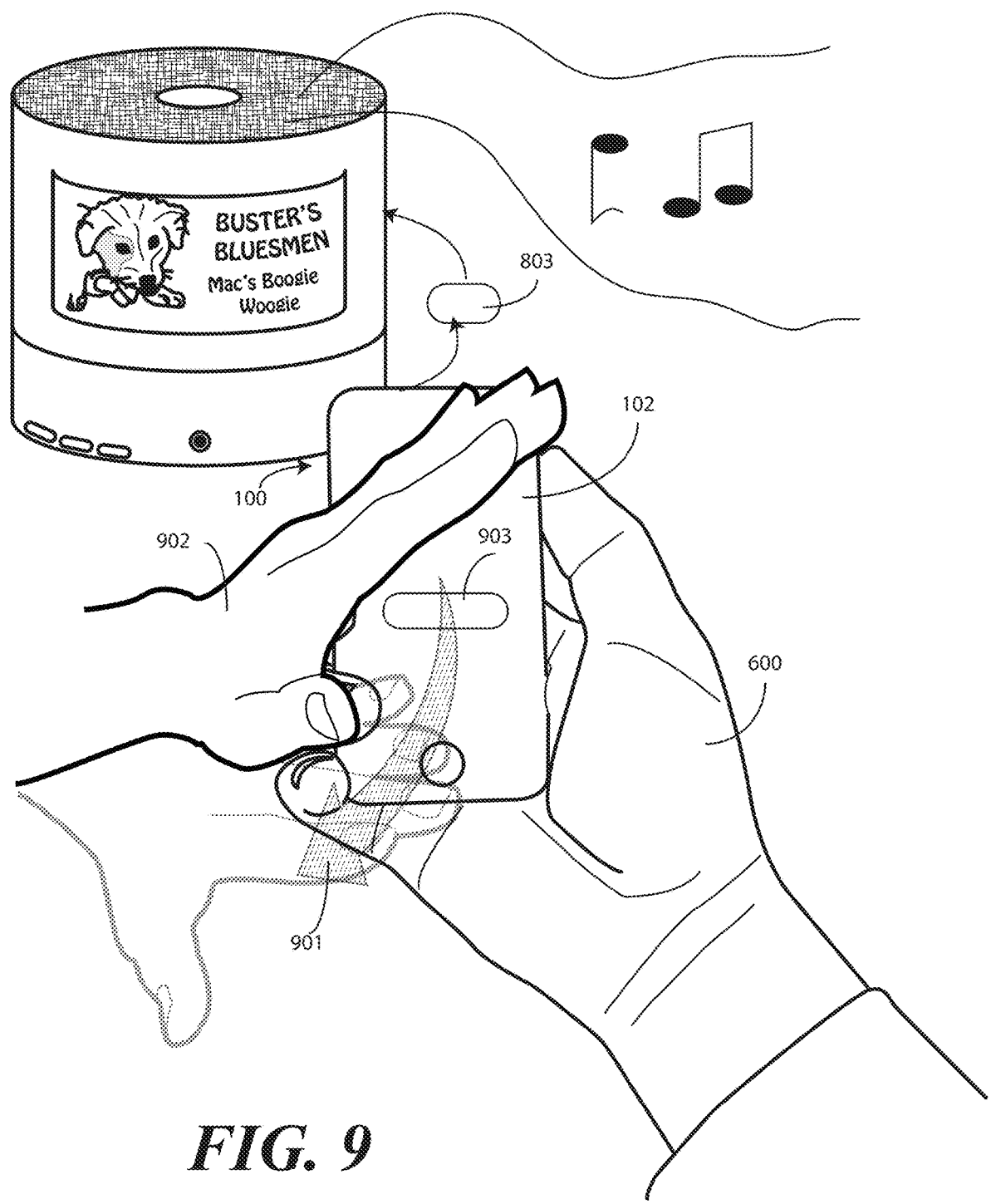
FIG. 9 illustrates one or more method steps for an explanatory system in accordance with one or more embodiments of the disclosure.

Regardless of whether the method of FIGS. 6-8, or the method of FIG. 9, or another method is used to unlock the music player, presume now that the user 600 wishes to turn on the disco strobe light. In one embodiment, the user 600 can do this by making a different gesture than that made in either FIGS. 6-8 or FIG. 9.

Figure 10:
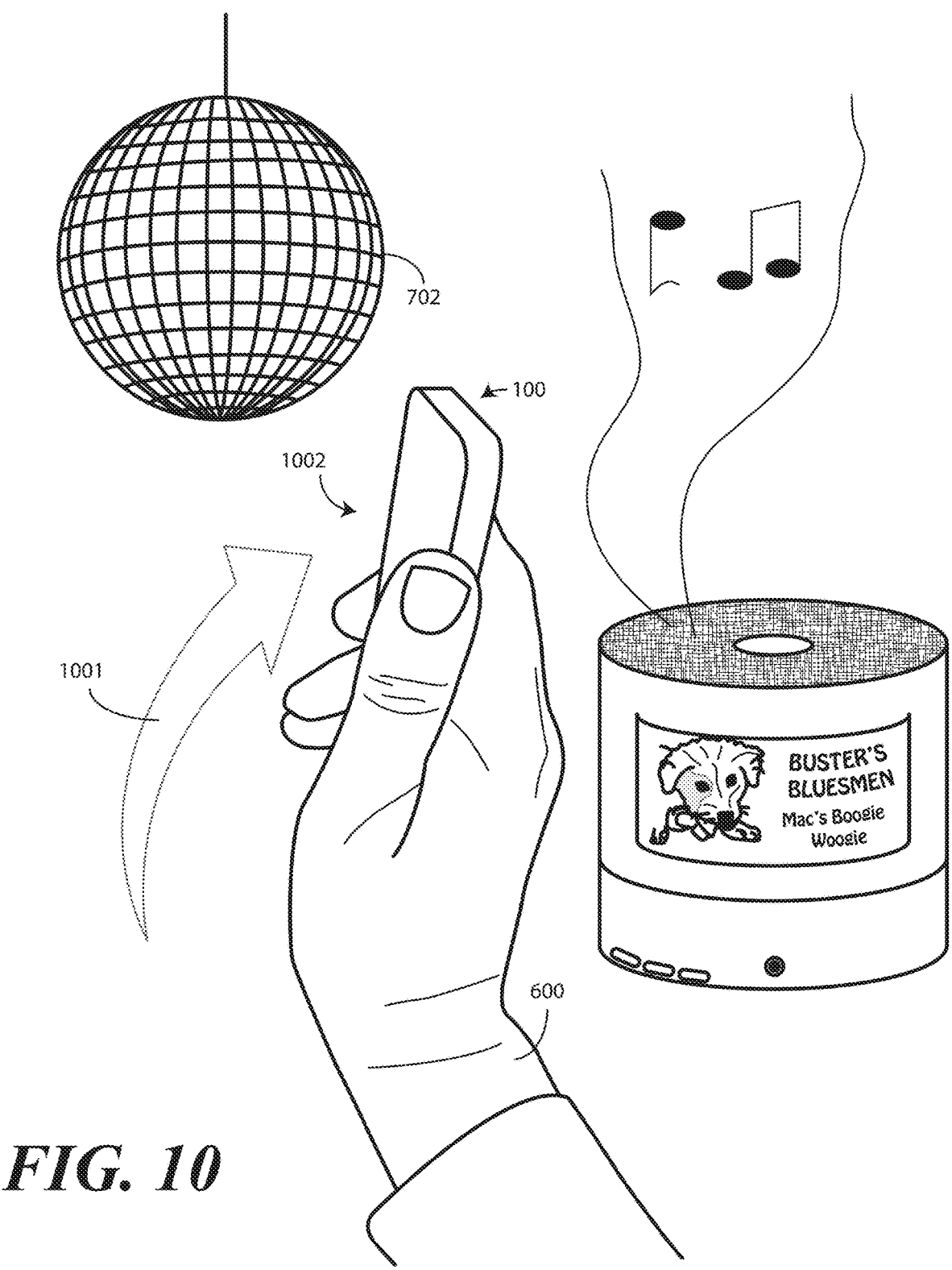
FIG. 10 illustrates one or more method steps for an explanatory system in accordance with one or more embodiments of the disclosure.

Turning now to FIG. 10, since the music player is ON, the user 600 wishes to turn on the disco strobe light. After orienting the major axis (705) of the electronic device 100 toward companion device 702 the user 600 wishes to select, as occurred in FIG. 7, rather than making a key turn simulation (801), the user 600 makes a snap back motion, which the auxiliary processor (108), from the motion sensors (116) will identify as being associated with the disco strobe light.

Figure 11:
FIG. 11 illustrates one or more method steps for an explanatory system in accordance with one or more embodiments of the disclosure.

As shown in FIG. 10, the user 600 first translates 1001 the electronic device 100 back to a first position 1002. As shown in FIG. 11, the user then translates 1101 the electronic device 100 to a second position 1102, thereby actuating the disco strobe light so that a club-type atmosphere is invoked to enhance the joy that the catalog of Buster and his Bluesmen.

It should be noted that the gesture (800) of FIG. 8 and the gesture of FIGS. 10-11 occurred after the user's finger (601) was removed from the fingerprint sensor (104). However, embodiments of the disclosure are not so limited. The method steps set forth in FIGS. 6-8 or FIGS. 10-11 could have also been performed while the finger (601) was on the fingerprint sensor (104) as well. Thus, in one or more embodiments, the gesture sensors identify a predefined gesture such as gesture (800) while the fingerprint sensor (104) receives fingerprint data from the finger (601). In one or more embodiments, this can make the intuitive gesture used to control the companion devices (701,702) faster.

Figure 12:
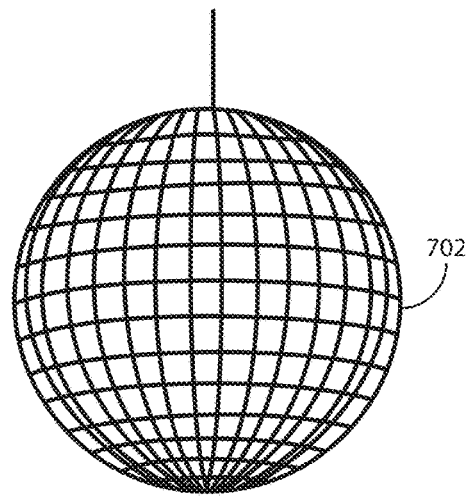
FIG. 12 illustrates one or more method steps for an explanatory system in accordance with one or more embodiments of the disclosure.
Figure 12:
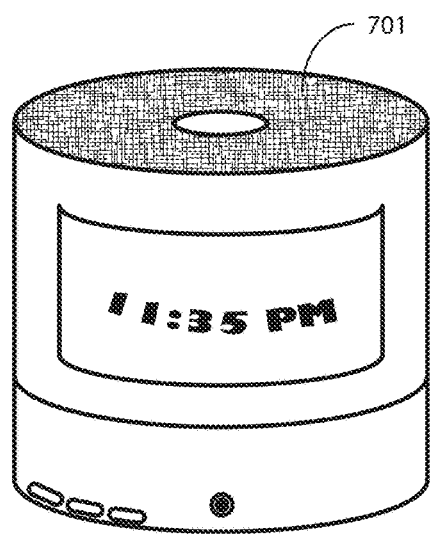
Figure 12:
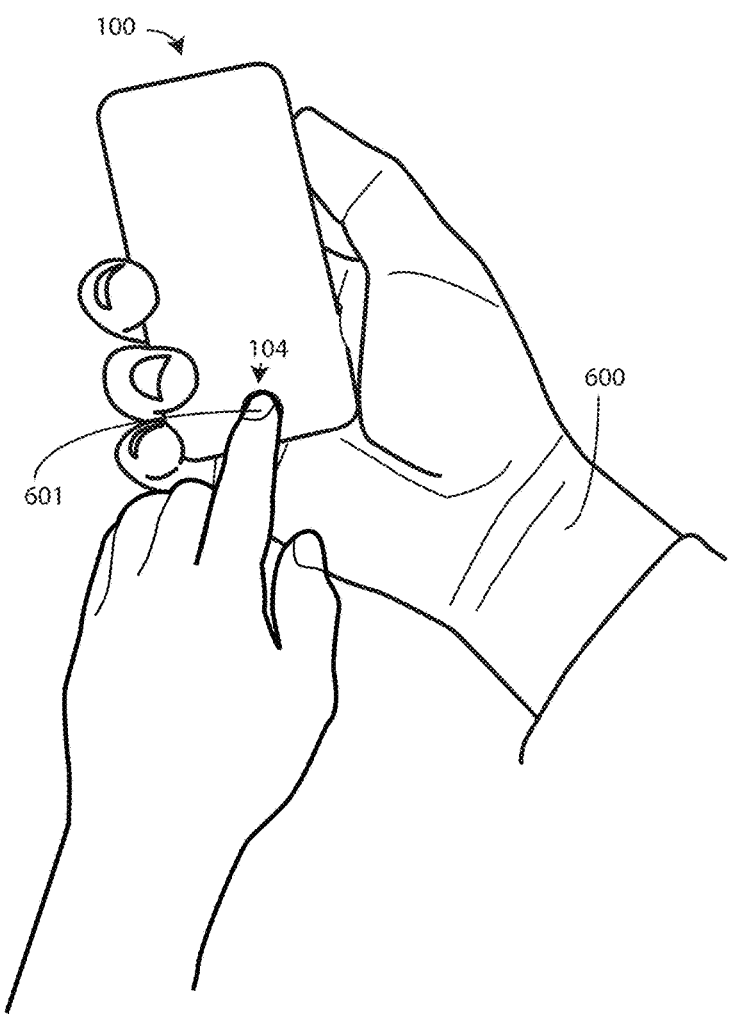

Turning now to FIGS. 10-12, illustrated therein are different method steps for selecting a companion device when multiple companion devices 701,702 are operating within a wireless communication radius of an electronic device 100.

Beginning with FIG. 12, a user 600 places their finger 601 on a fingerprint sensor 104 of an electronic device 100. When this occurs, the fingerprint sensor 104 identifies fingerprint data from the user's finger 601 to authenticate the user. As was the case with FIG. 7, the electronic device 100 has detected two companion devices 701,702 operating within the wireless communication radius (605). The first is the music player and the second is the disco strobe lamp.

Figure 13:
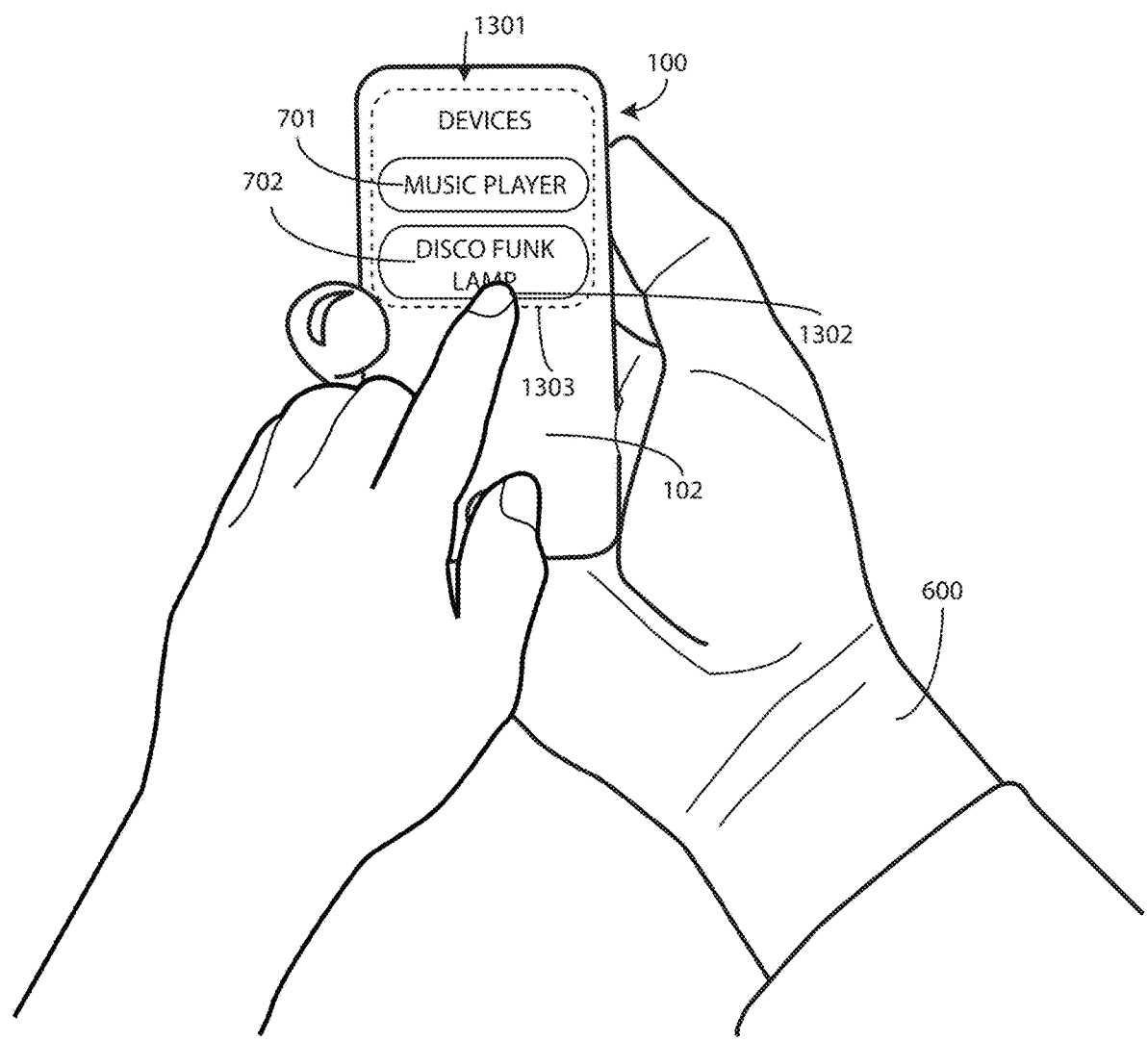
FIG. 13 illustrates one or more method steps for an explanatory system in accordance with one or more embodiments of the disclosure.
Figure 14:
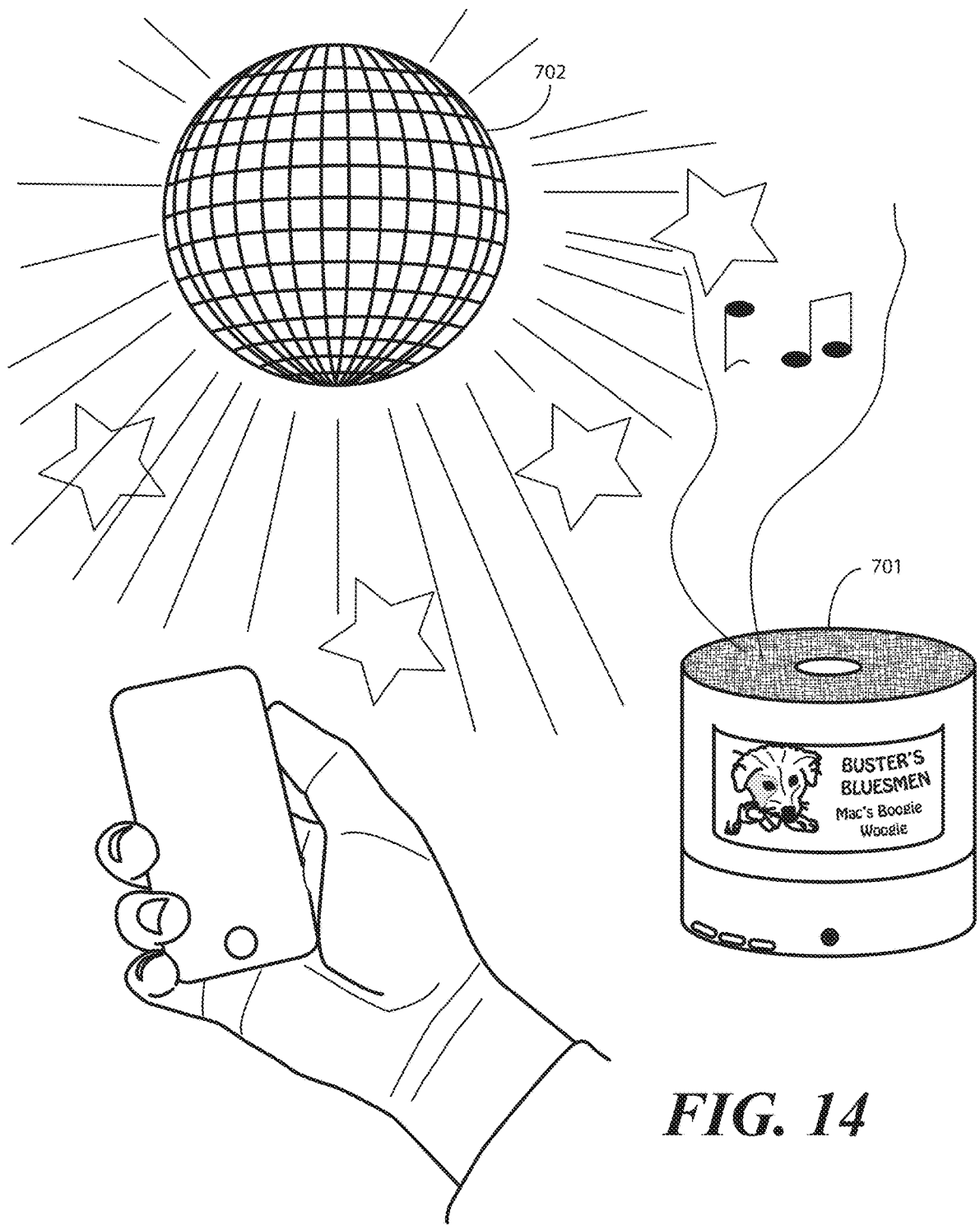
FIG. 14 illustrates one or more method steps for an explanatory system in accordance with one or more embodiments of the disclosure.

Turning now to FIG. 13, the auxiliary processor (108) of the electronic device 100 then presents identification 1303 of the companion devices 701,702 on the user interface of the electronic device 100. In this illustrative embodiment, the identification 1303 is a textual listing 1301 of the various companion devices 701,702 presented on the display 102 of the electronic device 100. The user 600 is then able to make a user selection 1302 of one or more of the companion devices 701,702 by touching user actuation targets corresponding to the companion devices 701,702. In this illustration, the user 600 has selected both the music player and the disco strobe light because he desires both to come on simultaneously.

The user 600 then executes the key turn simulation (801) as previously described. This causes the wireless communication circuit (109) operating in the electronic device 100, which is responsive to the auxiliary processor (108), to deliver an actuation credential to both companion devices (701,702) upon the one or more gesture sensors identifying the predefined gesture input defined by the key turn simulation (801). As shown in FIG. 12, this causes both companion devices 701,702 to actuate.

As shown and described, embodiments of the disclosure provides a secure and fast way to lock, unlock, or otherwise control a wireless companion device. Embodiments of the disclosure can be used to provide multiple users with a method to authenticate and lock, unlock, or otherwise control their specific wireless devices. Embodiments of the disclosure provide multiple users with a method to authenticate and lock, unlock, or otherwise define specific access levels on a shared wireless device. Embodiments of the disclosure provide a method for users to lock, unlock, or otherwise control a specific wireless devices when multiple devices are detected.

Moreover, embodiments of the disclosure provide a quick and intuitive technique to control companion devices. In one or more embodiments a user simply places their finger on a biometric sensor and performs a predefined gesture either after taking their finger off the biometric sensor or while the finger is on the biometric sensor. This simple key twist simulation is all that is required to control companion devices in an intuitive, simple manner.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a biometric sensor identifying biometric input received at the biometric sensor;
one or more processors operable with the biometric sensor, the one or more processors identifying one or more companion devices operating within a wireless communication radius of the electronic device while the biometric sensor receives the biometric input;
one or more gesture sensors identifying a predefined gesture input; and
a wireless communication circuit responsive to the one or more processors, the wireless communication circuit delivering an actuation credential to at least one companion device upon the one or more gesture sensors identifying the predefined gesture input.

2. The electronic device of claim 1, the biometric sensor comprising a fingerprint sensor, the biometric input comprising fingerprint data.

3. The electronic device of claim 2, the one or more gesture sensors comprising one or more of an accelerometer or a gyroscope, the predefined gesture input comprising a translation of the electronic device in free space between a first position and a second position.

4. The electronic device of claim 3, the predefined gesture input comprising a rotation of the electronic device about a major axis.

5. The electronic device of claim 3, the predefined gesture input comprising orienting a major axis of the electronic device toward the at least one companion device.

6. The electronic device of claim 1, the at least one companion device comprising at least two companion devices, the actuation credential causing the at least two companion devices to actuate simultaneously.

7. The electronic device of claim 2, the one or more gesture sensors comprising one or more proximity sensors, each proximity sensor comprising only an infrared signal receiver, the predefined gesture input comprising a predefined motion of an object, detected by the one or more proximity sensors, about the electronic device.

8. The electronic device of claim 1, the one or more processors, upon identifying multiple companion devices operating within the wireless communication radius, receiving a user selection of at least two companion devices.

9. The electronic device of claim 8, further comprising a user interface operable with the one or more processors, the one or more processors providing identification of the multiple companion devices with the user interface.

10. The electronic device of claim 9, the user interface comprising a display, the identification comprising a textual listing of the multiple companion devices.

11. The electronic device of claim 9, the user interface comprising an audio output device, the identification comprising an audio output signal identifying the multiple companion devices.

12. The electronic device of claim 1, further comprising a user interface operable with the one or more processors, the one or more processors providing a notification with the user interface that the actuation credential was delivered by the wireless communication circuit.

13. The electronic device of claim 1, the actuation credential unlocking the at least one companion device.

14. The electronic device of claim 13, the at least one companion device comprising a paired companion device.

15. The electronic device of claim 1, the one or more processors comprising an application processor and an auxiliary processor, the auxiliary processor identifying the one or more companion devices operating within the wireless communication radius and causing the wireless communication circuit to deliver the actuation credential to the at least one companion device.

16. A method in an electronic device, the method comprising:
identifying biometric input with a biometric sensor;
determining with one or more processors two or more companion devices are operable within a wireless communication radius of the electronic device;
detecting a gesture input with one or more gesture detectors;
identifying, with the one or more processors, the gesture input to be a predefined gesture; and
delivering an actuation credential with a wireless communication circuit to at least two companion devices in response to identifying the predefined gesture.

17. The method of claim 16, further comprising:
presenting, on a user interface operable with the one or more processors, a plurality of companion devices; and
receiving, with the user interface, user input identifying a selection of the at least two companion devices.

18. The method of claim 17, further comprising delivering a notification with the user interface indicating the actuation credential is delivered to the at least two companion devices.

19. An electronic device, comprising:
a fingerprint sensor identifying fingerprint data;
an application processor and an auxiliary processor, the auxiliary processor determining, with a wireless communication circuit, one or more companion devices in communication with the electronic device;
one or more motion sensors detecting a predefined gesture translating the electronic device in free space;
the wireless communication circuit delivering an actuation credential to at least one companion device in response to the one or more motion sensors detecting the predefined gesture.

20. The electronic device of claim 19, the auxiliary processor comprising a low power processor having a lower power consumption that the application processor.

* * * * *